_United States Patent Office_

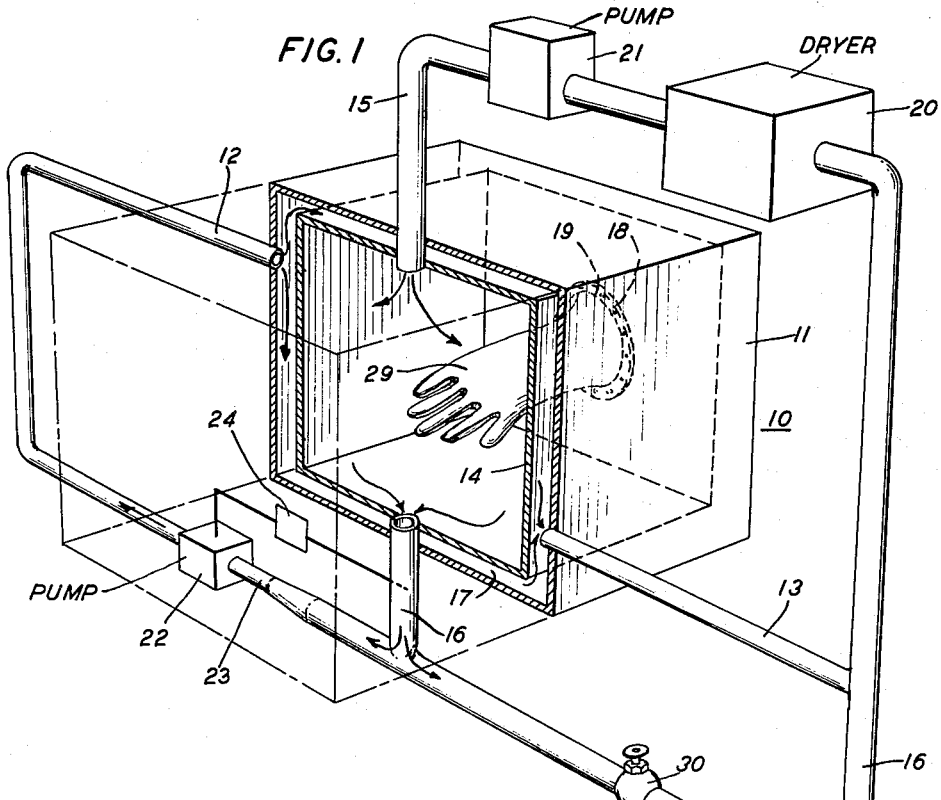
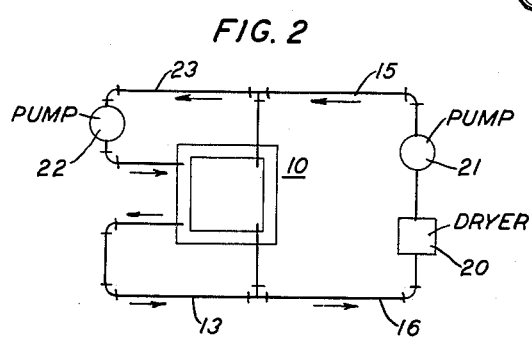
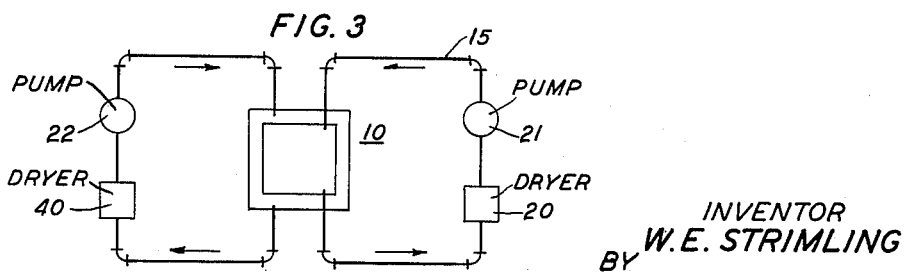
INVENTOR
W. E. STRIMLING
ATTORNEY

3,251,139
Patented May 17, 1966

3,251,139
DYNAMIC INSULATING SYSTEMS
Walter E. Strimling, Weston, Mass., assignor to United States Dynamics Manufacturing Corporation, Newton Highlands, Mass., a corporation of Massachusetts
Continuation of application Ser. No. 136,663, Sept. 7, 1961. This application Mar. 10, 1965, Ser. No. 441,955
3 Claims. (Cl. 34—54)

This is a continuation of application Serial No. 136,663, filed Sept. 7, 1961, now abandoned.

This invention relates to apparatus for isolating an environment from its ambient surroundings. More particularly, this invention relates to improved insulating techniques.

A common method of isolating an environment from its ambient surroundings is to include the environment within a chamber defined by the inner walls of a double walled enclosure. Typically, the space between the double walls of such an enclosure includes an insulating material which acts to inhibit the tendency toward equilibrium between the environment to be controlled and its surroundings. The usual procedure for maintaining this environmental difference is to include between the walls of the double walled chamber a suitable static insulator. In this connection the term "static insulator," as used hereinafter, shall be understood to define a material which contributes to the efficiency of the apparatus only by virtue of its inherent properties.

Although static insulators have been considerably improved through the development of new materials, they still leave much to be desired. Deficiencies manifest themselves in two important respects. First, apparatus for enclosing controlled environments such as a dry box or, as a more common example, a refrigerator, are unnecessarily encumbered by excessively large and wasted volumes for housing the static insulator. Second, large amounts of power are required to maintain the controlled environment in the desired state.

It is, accordingly, a first object of this invention to reduce the volume needed to insulate a controlled environment.

It is a second object of this invention to improve the efficiency of such systems by reducing the power necessary to maintain the controlled environment.

In accordance with the invention the static insulating material used heretofore is replaced by a dynamic insulating material. The term "dynamic insulating material" as used hereinafter shall be understood to define a suitable fluid having one or more physical or chemical properties of interest which correspond substantially to those of the controlled environment and which, similarly, are being degraded by the tendency toward equilibrium with the ambient environment but which are being reestablished either by being replaced by new fluid or by means of a regenerative process.

The dynamic insulating material comprises, in effect, a second controlled environment that is either derived from the primary controlled environment, or, alternatively, can constitute a separate system.

It is a feature of the invention that the volume included between the double walls of an enclosure containing the controlled environment is substantially less than comparable enclosures using static insulating means. Furthermore, the use of a dynamic insulator whose rate of flow and whose physical or chemical properties can be separately and independently controlled imparts a degree of flexibility to the system not possible heretofore.

The invention and its further objects and features will be understood more fully from the detailed description rendered in conjunction with the following drawing wherein:

FIG. 1 shows, partially in cross section, a first embodiment of the invention in which the dynamic insulator is derived from the output of the controlled environment;

FIG. 2 shows, schematically, a second embodiment of the invention in which the dynamic insulator is derived from the input of the controlled environment; and FIG. 3 shows, schematically, a third embodiment of the invention in which the dynamic insulator constitutes a separate system.

It is to be understood that the figures are not necessaily to scale, certain dimensions being exaggerated to better illustrate the invention.

Referring more specifically to FIG. 1 there is shown one embodiment of the invention comprising a double walled chamber 10 which can be of any shape and which is here shown as a cube. Chamber 10 includes an inner chamber 14 within which a first controlled environment is established, and a surrounding outer chamber 11. In operation, both chambers are normally sealed against the ambient environment. Access means for inserting materials within chamber 10 are provided (though not shown). It is to be understood that all comments hereinafter relating to accessibility to within chamber 10 are intended to describe conditions when chamber 10 is sealed.

The outer chamber 11 is constructed to be air-tight and is provided with an input conduit 12 and an output conduit 13. The inner chamber 14 has substantially the same shape as the outer chamber and is suitably supported within said outer chamber 11. Chamber 14 is similarly constructed to be airtight and is provided with an input conduit 15 and an output conduit 16. So constructed, and as shown in FIG. 1, there is provided a region 17 between the inner chamber 14 and the outer chamber 11. The region 17 essentially completely encompasses the inner chamber 14 and is accessible solely by means of conduits 12 and 13. The inner chamber 14 is, conversely, essentially completely encompassed by said region 17 and is accessible solely by means of conduits 15 and 16.

Extending through apertures 18 and 19 located in adjacent walls of chamber 11 and 14, respectively, is a resilient member 29. Member 29 is in the shape of a hand and can be made of rubber or any other suitable material to permit an operator to manipulate materials within chamber 10 from the outside. Advantageously, this can also be double walled separated conveniently by including a fine mesh cloth between the resilient walls. Suitable means, known in the art, are provided for sealing member 29 to the chamber walls to insure the airtight integrity of chamber 10.

The inclusion of member 29, though not essential to the invention is intended merely to illustrate the manner in which chamber 10 can be used.

In accordance with the invention, a controlled environment is established within the inner chamber 14 by circulating through chamber 14 a fluid whose physical properties have been tailored to the preferred state of the controlled environment. To facilitate further description, the term "controlled environment" shall be understood to refer to either the physical conditions within chamber 14 or the fluid used to establish these conditions.

While the invention has broader applications, some of which will be mentioned hereinafter, let it be assumed that the purpose of the arrangement of FIG. 1 is to maintain a dry environment within chamber 14. To this end gas, dried in a dryer 20 is pumped into chamber 14 by means of a pump 21. The gas flows out of input conduit 15 into chamber 14 and out through output conduit 16 through which it is returned to dryer 20 for a repetition of the cycle. The rate of flow of the gas can be controlled by controlling the pump 21 or by means of a valve 30.

In a typical prior art arrangement using static insulating techniques and operating in an ambient environment having a moisture content of 17,500 p.p.m. (50 percent humidity at 80° F.), gas entering chamber 14 with a moisture content of one part per million (1 p.p.m.) would, due to leaks in the chamber seals and seepage through the chamber walls and insulation, leave chamber 14 with a moisture content of over 15 p.p.m. To reduce this latter figure below 15 p.p.m., using prior art techniques, would require greater care in the construction of the chamber to reduce leaks, special precautions to reduce seepage through the chamber walls, increased energy input to a more powerful pump and dryer assembly and other special precautions of an expensive nature.

In accordance with the invention, however, a substantial reduction in the moisture content of the controlled environment as evidenced by the moisture content of the exhaust gas, i.e., the gas leaving chamber 14, can be obtained by circulating a portion of the exhaust gas within the region 17 between the inner chamber 14 and the outer chamber 11. This is accomplished in the illustrative embodiment of FIG. 1 by means of a connection 23 which connects output conduit 16 to conduit 12 through a gas pump 22.

Pump 22 is substantially smaller than pump 21 since the volume of gas to be pumped between the chamber is considerably less than the volume pumped into chamber 14. Specifically, the volume of gas that need be circulated by pump 22 will vary as will be explained in greater detail hereinafter.

The exhaust gas, upon leaving conduit 12, fills region 17 and completely encompasses the inner chamber 14. This gas forms what was referred to hereinabove as a dynamic insulation since it is relatively dry gas which under the circumstances constitutes a preferred physical state and furthermore it is a constant state of motion around the chamber to be insulated. Upon leaving region 17, the moisture content of the gas initially may be as high as 25 p.p.m. or more, but because of its relatively small volume it places no undue burden upon dryer 20 when it rejoins the man gas stream in conduit 16 by way of output conduit 13.

The effect of having a moving stream of relatively dry gas between the outer and inner chambers, is to remove a large proportion of the moisture which may have penetrated the outer chamber walls before it has an opportunity to similarly penetrate the inner chamber. This has the effect of substantially reducing the moisture content of the exhaust gas from more than 15 p.p.m. to less than 5 p.p.m. To maintain this or any other predetermined moisture content in the exhaust gas, a moisture detection device 24 is inserted into conduit 16.

The latter can be any type of moisture detector well known in the art as, for example, the so-called "Moisture Monitor" made by the Consolidated Electrodynamics Corporation of Pasadena, California, a subsidiary of Bell & Howell. If the moisture content of the exhaust gas rises above a predetermined level, detector 24 operates upon pump 22, increasing the volume of gas circulated by pump 22 through region 17. This increased flow of gas enhances the insulation of chamber 14 by an amount sufficient to restore the moisture content to its preset level.

The advantage in this arrangement lies in the fact that the moisture level within chamber 10 is maintained at a predetermined level by controlling the smaller circulating system, i.e., pump 22, rather than the main circulating system, i.e., pump 21. The latter can thus operate at a relatively uniform rate which, most advantageously, can be its most efficient rate.

In the embodiment of FIG. 1 the dynamic insulation was derived from the output of the chamber 14. It is apparrent, however, that the dynamic insulation can, alternatively be derived from the input to chamber 14 or it may comprise a separate circulatory system. These alternative arrangements are schematically illustrated in FIGS. 2 and 3, respectively.

In FIG. 2 the chamber 10, pump 21 and dryer 20 are connected as explained above. The dynamic insulation, however, is derived from input conduit 15.

In FIG. 3, chamber 10, pump 21 and dryer 20 are connected as explained above. The dynamic insulation system is completely independent, however, having its own dryer 40.

Various other modifications in the system can be made. For example, pump 22 in the dynamic insulation system in the embodiments of FIG. 1 and FIG. 2 can be replaced by a simple valve which operates as a variable restriction in the dynamic insulation circulatory system. The valve can then be manually or automatically controlled.

While the various illustrative embodiments have been characterized as one in which the moisture content of the controlled environments was controlled, it is apparent that the principles of the invention can be applied readily to other situations in which the temperature, chemical purity or other property of the controlled environment is of importance. Thus, in all cases it is understood that the above-described arrangements are merely illustrative of a small number of the many possible specific embodiments which can represent applications of the principles of the invention. For example, it should be apparent that multiple wall chambers can also be used to advantage in accordance with the invention. Thus, numerous and varied other arrangements can readily be devised in accordance with these principles by those skilled in the art without departing from the spirit and scope of the invention.

What is claimed is:

1. In combination, a first enclosure isolating a first controlled environment of prescribed properties, means for establishing said properties within said first enclopurity or other property of the controlled environment is sure, at least a second enclosure encompassing said first enclosure, an output conduit connecting said first and second enclosures for admitting exhaust from said first enclosure into said second enclosure, control means for monitoring said exhaust, and means responsive to said control means for simultaneously establishing a second controlled envirionment having substantially said properties within said second enclosure.

2. The combination in accordance with claim 1 wherein second enclosure includes a volume smaller than said first.

3. The combination in accordance with claim 1 wherein said means for simultaneously establishing said properties within said second enclosure includes said means for establishing said properties within said first enclosure.

References Cited by the Examiner

UNITED STATES PATENTS

| 1,902,575 | 3/1933 | Nichols | 34—15 X |
| 2,579,567 | 12/1951 | Greene | 165—108 |
| 2,707,377 | 5/1955 | Morrison | 62—50 |

WILLIAM F. O'DEA, *Primary Examiner.*

D. A. TAMBURRO, *Assistant Examiner.*